(12) United States Patent
Yamada et al.

(10) Patent No.: US 7,155,332 B2
(45) Date of Patent: Dec. 26, 2006

(54) METHOD FOR OBTAINING EXHAUST GAS FLOW QUANTITY, EXHAUST GAS FLOW MEASUREMENT APPARATUS, AND EXHAUST GAS RECIRCULATION CONTROL SYSTEM

(75) Inventors: Masamichi Yamada, Hitachinaka (JP); Yoshihiro Sukegawa, Hitachi (JP); Shiro Yamaoka, Hitachi (JP); Noboru Tokuyasu, Hitachinaka (JP); Katsuaki Fukatsu, Naka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/212,769

(22) Filed: Aug. 29, 2005

(65) Prior Publication Data

US 2006/0069494 A1 Mar. 30, 2006

(30) Foreign Application Priority Data

Sep. 30, 2004 (JP) ............................. 2004-285649

(51) Int. Cl.
*G06F 17/00* (2006.01)
*F02M 25/07* (2006.01)
*G01M 15/00* (2006.01)
*F02D 21/08* (2006.01)

(52) U.S. Cl. ................. 701/108; 123/568.21; 73/117.3
(58) Field of Classification Search ................ 701/108, 701/109, 102; 123/568.21, 478, 568.12, 123/568.26; 73/117.3, 118.1; 60/605.2
See application file for complete search history.

(56) References Cited

U.S. PATENT DOCUMENTS 6,502,556 B1 * 1/2003 Wienand et al. ....... 123/568.21
6,993,909 B1 * 2/2006 Matsunaga et al. ........ 73/118.1
2002/0108603 A1   8/2002 Weinand et al.
2005/0193978 A1 * 9/2005 Ishikawa ............... 123/568.21

FOREIGN PATENT DOCUMENTS

| JP | 09-126060 | 5/1997 |
|----|-----------|--------|
| JP | 2002-327634 | 11/2002 |
| JP | 2003-516496 | 5/2003 |

* cited by examiner

*Primary Examiner*—Hieu T. Vo
(74) *Attorney, Agent, or Firm*—Crowell & Moring LLP

(57) ABSTRACT

An exhaust recirculation control system of the internal combustion engine computes an oxygen concentration in total intake air containing recirculation exhaust gas in a cylinder and the ratio between an oxygen quantity in the total intake air and a fuel injection quantity (oxygen quantity/fuel injection quantity ratio). The computed values are compared with target values which are pre-set according to engine operating conditions and, based on the result of the comparison, at least an EGR valve or a fuel injection quantity. In order to perform such a control with high accuracy, a correcting means corrects a recirculation exhaust gas mass flow signal from a gas mass flowmeter on the basis of a predicted exhaust gas component concentration. And, by using the corrected recirculation exhaust gas mass flow, oxygen concentration in total intake air containing the recirculation exhaust gas in the cylinder and the ratio between the oxygen quantity in the total intake air and the fuel injection quantity (target oxygen quantity/fuel injection quantity ratio) are computed to perform EGR control.

19 Claims, 10 Drawing Sheets

FIG. 7 i = 1-n

| V (V) | V1 | V2 | - | Vi | - | Vn |
|---|---|---|---|---|---|---|
| Q (kg/h) | Q1 | Q2 | - | Qi | - | Qn |

FIG. 8

| Do/V | V1 | V2 | - | Vi | - | Vn |
|---|---|---|---|---|---|---|
| Do1 | Q11 | Q12 | - | Q1i | - | Q1n |
| Do2 | Q21 | Q22 | - | Q2i | - | Q2n |
| - | - | - | - | - | - | - |
| Doj | Qj1 | Qj2 | - | Qji | - | Qjn |
| - | - | - | - | - | - | - |
| Dom | Qm1 | Qm2 | - | Qmi | - | Qmn |

Do = Do1

| Te/V | V1 | V2 | – | Vi | – | Vn |
|---|---|---|---|---|---|---|
| Te1 | Q111 | Q112 | – | Q11i | – | Q11n |
| Te2 | Q121 | Q122 | – | Q12i | – | Q12n |
| – | – | – | – | – | – | – |
| Tej | Q1j1 | Q1j2 | – | Q1ji | – | Q1jn |
| – | – | – | – | – | – | – |
| Tem | Q1m1 | Q1m2 | – | Q1mi | – | Q1mn |

Do = Dok (k = 1, L)

| Te/V | V1 | V2 | – | Vi | – | Vn |
|---|---|---|---|---|---|---|
| Te1 | Qk11 | Qk12 | – | Qk1i | – | Qk1n |
| Te2 | Qk21 | Qk22 | – | Qk2i | – | Qk2n |
| – | – | – | – | – | – | – |
| Tej | Qkj1 | Qkj2 | – | Qkji | – | Qkjn |
| – | – | – | – | – | – | – |
| Tem | Qkm1 | Qkm2 | – | Qkmi | – | Qkmn |

Do = DoL

| Te/V | V1 | V2 | – | Vi | – | Vn |
|---|---|---|---|---|---|---|
| Te1 | QL11 | QL12 | – | QL1i | – | QL1n |
| Te2 | QL21 | QL22 | – | QL2i | – | QL2n |
| – | – | – | – | – | – | – |
| Tej | QLj1 | QLj2 | – | QLji | – | QLjn |
| – | – | – | – | – | – | – |
| Tem | QLm1 | QLm2 | – | QLmi | – | QLmn |

US 7,155,332 B2

METHOD FOR OBTAINING EXHAUST GAS FLOW QUANTITY, EXHAUST GAS FLOW MEASUREMENT APPARATUS, AND EXHAUST GAS RECIRCULATION CONTROL SYSTEM

CLAIM OF PRIORITY

The present application claims priority from Japanese application serial no. 2004-285649, filed on Sep. 30, 2004, the contents of which are hereby incorporated by references into this application.

BACKGROUND OF THE INVENTION

The present invention relates to an EGR, that is, an exhaust gas recirculation control system for properly re-circulating exhaust gases of an internal combustion engine to an air intake system, a method for obtaining flow quantity of the exhaust gases, and an exhaust gas flow measurement apparatus.

In recent years, an exhaust gas recirculation (EGR) for realizing reduction in NOx by re-circulating part of the exhaust to an air intake system is being widely used. A recirculation quantity (EGR amount) has to be controlled with high accuracy so as to also achieve stability of combustion. In particular, in the case of applying the EGR to a diesel engine, when the EGR becomes excessive, a large quantity of smoke is produced. Consequently, high-accuracy EGR control according to the operating conditions of the engine is necessary.

One of conventional EGR controls is disclosed in Japanese publication No. 2003-516496. The conventional technique is comprised of an intake air mass flowmeter for measuring an intake quantity of air taken into an intake passage, and a recirculation exhaust gas mass flowmeter for measuring an EGR gas quantity provided in an exhaust recirculation passage. The EGR control is performed on the basis of an EGR rate (=EGR gas quantity/(intake air flow quantity+EGR gas flow quantity)) from the intake air flow quantity and the EGR gas flow quantity measured by the respective flowmeters.

In such a conventional technique, high accuracy EGR control according to the operating conditions of the engine cannot be realized sufficiently. Because, in an internal combustion engine, although a quantity of oxygen contained in exhaust gases largely changes according to engine conditions, the conventional EGR system doesn't make special consideration in this respect. That is, in low or intermediate load, a large amount of oxygen is contained in the exhaust gases due to lean-burn operation mode with rich air in mixture, on the other hand, in high load, the oxygen in the exhaust gases decreases due to stoichiometric mixture ratio or rich-burn operation mode.

In the conventional technique, only information of an EGR gas quantity is obtained from the recirculation exhaust gas flowmeter but information of the oxygen in the exhaust gases cannot be obtained. Consequently, it is difficult to perform high-accuracy EGR control.

On the other hand, Japanese publication No. H9(1997)-126060 describes a conventional exhaust recirculation control method of performing EGR control in order to reduce smoke in accordance with changes in the absolute value of oxygen in the total intake air containing EGR gases and in order to reduce NOx in accordance with changes in the concentration of oxygen in the total intake air.

In the conventional technique, at the time of performing the exhaust gas recirculation control by adjusting the opening of the EGR valve in accordance with operating conditions of the engine, oxygen concentration in the total intake air including the EGR gases and the ratio between the quantity of oxygen in the total intake air and the fuel injection quantity (namely oxygen/fuel ratio) is obtained. The oxygen/fuel ratio and a smoke allowable limit value are compared with each other. When the oxygen/fuel ratio is low, the EGR valve is controlled so that the oxygen/fuel ratio becomes equal to the smoke allowable limit value. When the oxygen/fuel ratio is high, the EGR valve is controlled so that the oxygen concentration becomes equal to target oxygen concentration. By the control, an oxygen quantity necessary to maintain the target smoke level can be assured. While always suppressing the smoke exhaust quantity to be within the allowable value, NOx can be reduced maximally.

In this conventional EGR control system, in order to measure the oxygen concentration in the total intake air including the EGR gases and the oxygen quantity, the following techniques is adopted. On the downstream side (engine side) of the position of connection for the exhaust recirculation passage in the intake air passage of an internal combustion engine, a flow measurement means is provided for measuring the flow quantity of a total intake air including EGR gases. The flow measurement means is comprised of a pressure sensor for sensing intake pressure and an intake temperature sensor for measuring intake temperature. An $O_2$ sensor for measuring oxygen concentration in the total intake air is also provided on such a downstream side. The $O_2$ sensor senses the oxygen concentration by using an electromotive force of a solid electrolyte or the like.

The conventional technique constructed as described above has a problem such that actual $O_2$ concentration in the total intake air containing the EGR gas and $O_2$ concentration measured by the $O_2$ sensor are different from each other due to a chemical reaction delay in the $O_2$ sensor. Therefore, the control accuracy, particularly, control accuracy at the time of transition largely deteriorates. In case where the flowmeter for measuring the flow quantity of the total intake air is comprised of the intake pressure sensor and the intake temperature sensor, it is difficult to accurately measure mass flow of the total intake air. Because, although the ratio of gas components in the total intake air containing the EGR gas change according to engine operating conditions, the aforementioned flowsensor cannot sense such changes of the gas components.

SUMMARY OF THE INVENTION

An object of the present invention is to realize a method of obtaining a flow quantity of exhaust gases with high accuracy measurement and an exhaust gas flow quantity measurement apparatus, and to realize an exhaust gas recirculation control system having high response and capable of performing high-accuracy EGR control.

The object is achieved by the inventions described in the claims.

For example, the object is achieved the following method. A flow quantity of exhaust gases flowing from an exhaust side to an intake side of an internal combustion engine through a passage for exhaust gas recirculation, is measured by using a flowmeter provided in the passage. The flowmeter has a heating resistor controlled so as to have a predetermined temperature difference with respect to a temperature of the exhaust gases.

An oxygen concentration of the exhaust gases is predict or sensed, and the flow quantity of the exhaust gases flowing through the passage is obtained on the basis of a signal from the flowmeter and the oxygen concentration.

According to the invention, a method of obtaining a flow quantity of an exhaust gases with high accuracy, an exhaust gas flow quantity measurement apparatus, and an exhaust recirculation control system realizing excellent response and capable of performing EGR control with high accuracy can be realized.

BRIEF DESCRIPTION OF DRAWINGS

FIG. 7 is an output-mass flow correction map.

FIG. 8 is an output-oxygen concentration-mass flow correction two-dimensional map.

DETAILED DESCRIPTION OF THE PREFERRED EMBODIMENT

Embodiments of the present invention will be described hereinafter with reference to the drawings.

Figure 1:
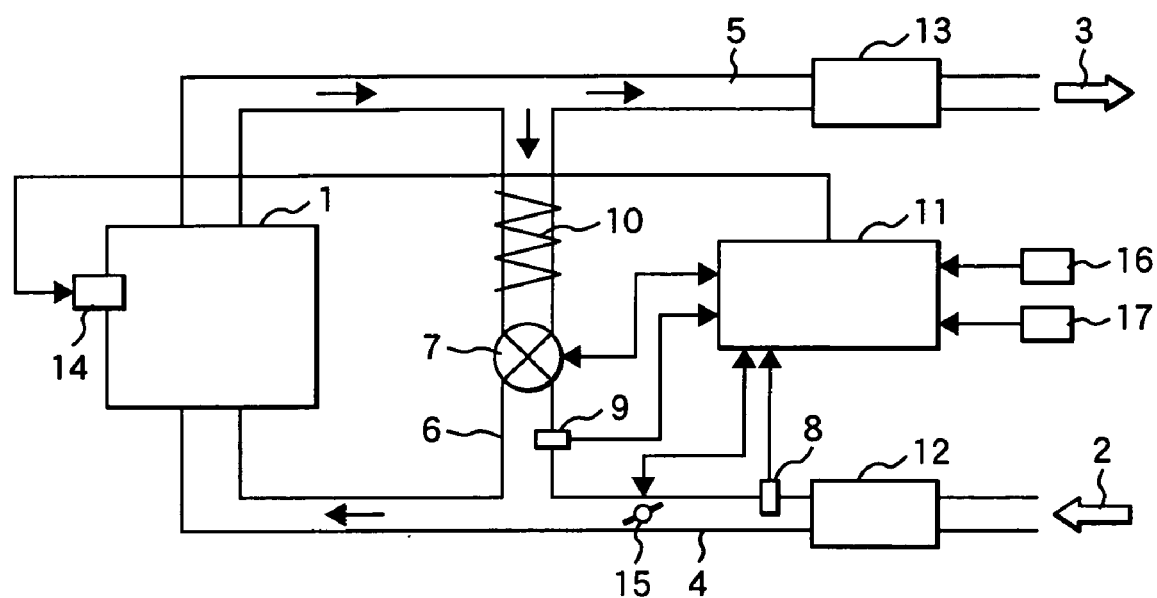
FIG. 1 is a block diagram of an exhaust recirculation control system as an embodiment of the present invention.

FIG. 1 shows an exhaust recirculation control system as a first embodiment of the present invention, and the configuration will be described below. The exhaust recirculation control system mainly has an internal combustion engine 1, an intake passage 4 in which an air cleaner 12 and a throttle valve 15 are disposed for feeding an intake air 2 to the internal combustion engine 1, an exhaust passage 5 for discharging exhaust gases 3 via an exhaust gas catalyst 13 for purifying exhaust gases 3, an EGR valve 7 provided at an exhaust gas recirculation passage 6 for circulating (re-circulating) the exhaust gases, an EGR cooler 10 for cooling the exhaust gases and for increasing cylinder intake efficiency, an intake air mass flowmeter 8 provided at the intake passage 4 for measuring an intake air mass flow quantity, a recirculation exhaust gas mass flowmeter 9 provided at the exhaust recirculation passage 6 for measuring a recirculation exhaust gas mass flow quantity, an accelerator position sensor 16 and an engine speed sensor 17 indicative of driving conditions, and a control unit 11 for operating the EGR valve 7, the throttle valve 15 and a fuel injector 14 in accordance with information from the sensors and the engine operating states.

The exhaust gas recirculation passage 6 is a passage directly connecting between the exhaust passage 5 and the intake passage 4 so as to bypass the internal combustion engine 1. Respective actuators of the EGR valve 7 and the throttle valve 15 are electrically connected to the control unit 11. A part of exhaust gases is fed into the intake passage 4 by controlling the EGR valve 7 and the throttle valve 15 to flow into intake airflow, and re-circulates into the engine 1.

The intake air mass flowmeter 8 and the recirculation exhaust gas mass flowmeter 9 are comprised of thermal mass flowmeters having at least heaters (namely heating resistor) as gas mass flow measurement elements, and directly sense mass flows with heat radiation characteristics (heat transfer efficiency) of heaters to the intake airflow and the recirculation exhaust gas-flow. The temperature of each heater is set to be higher than the temperature of each fluid to be measured as flow quantity by a predetermined temperature, or set to be a predetermined fixed temperature. These mass flow quantities are sensed by power supplied to the heater, the temperature distribution of the heater, and the like.

The intake air mass flowmeter 8 and the recirculation exhaust gas mass flowmeter 9 are electrically connected to the control unit 11. As the other sensors for sensing operating conditions, the engine speed sensor 17 for sensing a rotational speed Ne of the engine 1 and the accelerator position sensor 16 for sensing an accelerator position are provided and electrically connected to the control unit 11.

Figure 2:
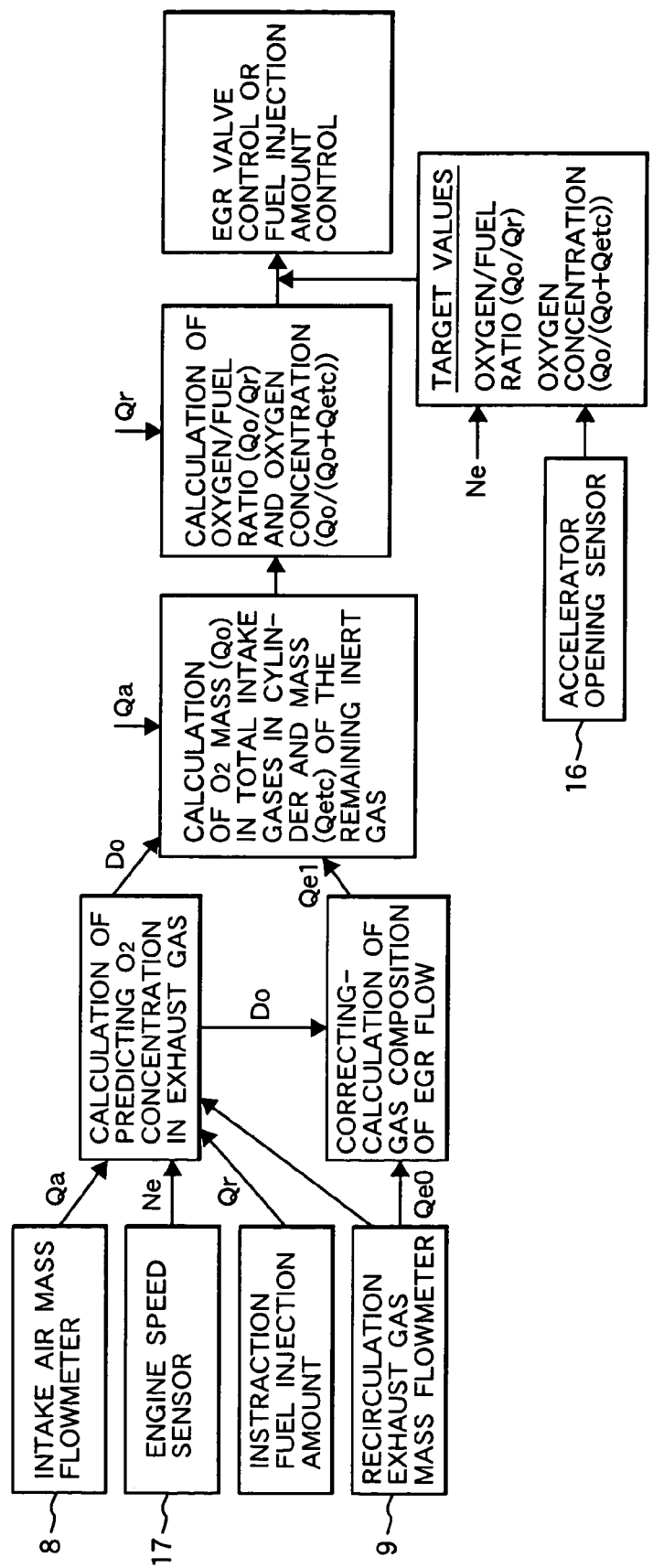
FIG. 2 is a diagram illustrating functions in an exhaust recirculation control method.

Next, the exhaust recirculation control method executed with the control unit 11 of the embodiment will be described with reference to FIG. 2.

The control unit 11 is composed of an input/output unit, a storing unit, and a computing unit (CPU). The input/output unit is electrically connected to the various sensors and actuators. The storing unit stores the following information as maps: respective instruction quantities Qr of fuel injections corresponding to operating conditions such as the engine rotational speed Ne; an acceleration position VL, and the like; target oxygen concentrations in total intake air quantities containing the recirculation exhaust gases; target oxygen quantities/fuel injection quantities ratios, a smoke allowable limit (smoke limit), and the like.

The computing unit (CPU) executes the following computations. As a first step: a basic injection quantity is computed from data of the sensed engine speed Ne and accelerator position with reference of a map of an engine speed Ne and an accelerator position; and an injection quantity for obtaining a driving force necessary for accessories such as an air conditioner or the like is computed. A second step: an instruction fuel injection quantity Qr is computed by the sum of the basic injection quantity and the injection quantity for the accessories. Further, a computation for predicting a exhaust gas component concentration (oxygen concentration Do) in an engine cylinder is executed from the following information: an intake air mass Qa from the intake air mass flowmeter; a recirculation exhaust gas mass flow quantity Qeo before correction from the recirculation exhaust gas mass flowmeter 9; the engine speed Ne from the engine speed sensor 17; and the instruction fuel injection quantity Qr.

Next, based on the predicted exhaust gas component concentration (oxygen concentration Do), the recirculation exhaust gas mass flow quantity Qeo is corrected, thereby obtaining a corrected recirculation exhaust mass flow quantity Qe1. Further, an oxygen mass Qo(=Oa*0.21+Qe1*Do) in the total intake air containing the recirculation exhaust gases in the cylinder, and the other inactive gas mass Qetc (=Qa+Qe1−Qo) are computed from the corrected recirculation exhaust gas mass flow quantity Qe1, the predicted exhaust gas component concentration (oxygen concentration Do), and the intake air mass Qa. After that, oxygen concentration (Qo/(Qo+Qetc)) in the total intake air containing the recirculation exhaust gases in the cylinder, and the ratio between the quantity of oxygen in the total intake air and the fuel injection quantity (oxygen quantity/fuel injection quantity ratio) (Qo/Qr) is computed with high accuracy. The computed oxygen concentration (Qo/(Qo+Qetc)) in total intake air and quantity/fuel injection quantity ratio (Qo/Qr) are compared with a target oxygen concentration (Qo/(Qo+ Qetc)) in the total intake air and a target oxygen quantity/fuel injection quantity ratio (Qo/Qr). The target oxygen concentration and the target oxygen quantity/fuel injection quantity ratio are pre-set according to engine operating conditions (engine speed Ne and the accelerator position) in the storing unit. Based on the result of such a comparison, the opening of the EGR valve 7, the throttle valve 15, or a fuel injection quantity Qr of the fuel injector 14 is controlled.

Figure 3:
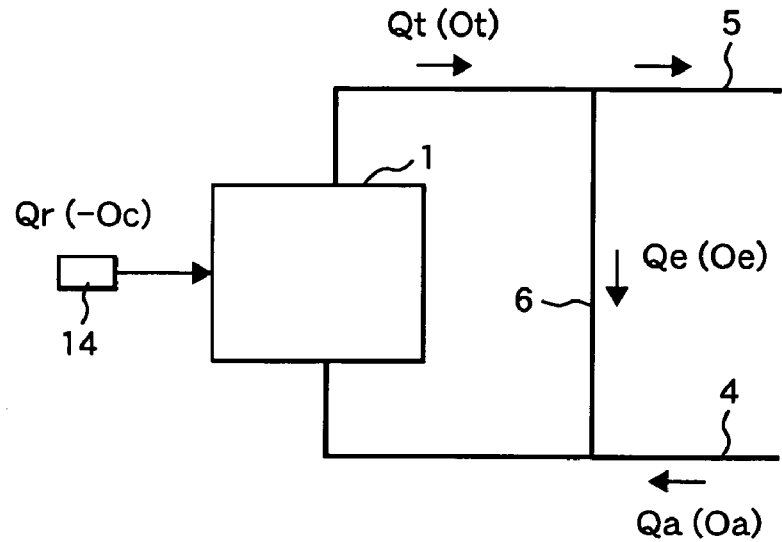
FIG. 3 is a diagram illustrating prediction exhaust gas oxygen concentration.

The computation for predicting exhaust gas component concentration for each of combustions in the cylinder, will be described as follows with reference to FIG. 3.

As a first step, the concentration of oxygen in an exhaust gases is estimated. In FIG. 3, the intake air mass flow quantity Qa (including oxygen mass flow Oa) and the recirculation exhaust gas mass flow Qe quantity (including oxygen mass flow Oe) are took into the cylinder 1 of the internal combustion engine. And fuel of the instruction fuel injection quantity (mass) Qr is injected from the fuel injector 14 into the cylinder 1. When injecting such a fuel, mass Qt of burned exhaust gases discharged from the cylinder per revolution (including the oxygen mass flow Ot) is expressed by the following equation.

$$Qt = Qa + Qe + Qr \quad (1)$$

The oxygen mass flow quantity Ot in the burned exhaust gases is expressed by the following equation when oxygen mass consumed by burning of the instruction fuel injection quantity Qr in the cylinder is Oc.

$$Ot = Oa + Oe − Oc \quad (2)$$

Since the component ratio of oxygen and that of nitrogen doesn't change, the oxygen mass flow quantity Oa in the intake air is expressed as follows.

$$Oa = 0.21 \times Qa \quad (3)$$

The mass Oc of oxygen consumed for combustion in the cylinder with the instruction fuel injection quantity Qr is expressed by the following equation by using the stoichiometric air fuel ratio of combustion (14.6).

$$Oc = 0.21 \times Qr \times 14.6 = 3.1 \times Qr \quad (4)$$

When Equations (3) and (4) are substituted for Equation (2), the following is obtained.

$$Ot = 0.21 \times Qa + Oe − 3.1 \times Qr \quad (5)$$

Since the oxygen concentration Do of the burned exhaust gas mass Qt (including the oxygen mass flow quantity Ot) and that of the recirculation exhaust gas mass flow quantity Qe (including the oxygen mass flow quantity Oe) are the same, the following is satisfied.

$$Do = Ot/Qt = Oe/Qe \quad (6)$$

When Equations (1) and (5) are substituted for Equation (6), the oxygen mass flow quantity Oe in the recirculation exhaust gases is obtained as follows.

$$Oe = (0.21 \times Qa − 3.1 \times Qr)/(Qa + Qr) \quad (7)$$

Therefore, the oxygen concentration Do of the recirculation exhaust gases is expressed as follows.

$$Do = Oe/Qe = (0.21 \times Qa − 3.1 \times Qr)/(Qa + Qr)/Qe \quad (8)$$

Since Qa is obtained from the intake air mass follow meter 8, Qe is obtained from the recirculation exhaust gas mass flowmeter 9, and Qr is obtained as an instruction fuel injection quantity, respectively, the oxygen mass flow quantity Oe of the recirculation exhaust gases and the oxygen concentration (Do) of the recirculation exhaust gases can be computed from Equations (7) and (8).

Next, a method of performing correction computation (Qe1 after correction) on the recirculation exhaust gas mass flow quantity Qeo from the recirculation exhaust gas mass flowmeter 9 on the basis of the computed predicted exhaust gas component concentration (oxygen concentration Do) will be described.

Figure 4:
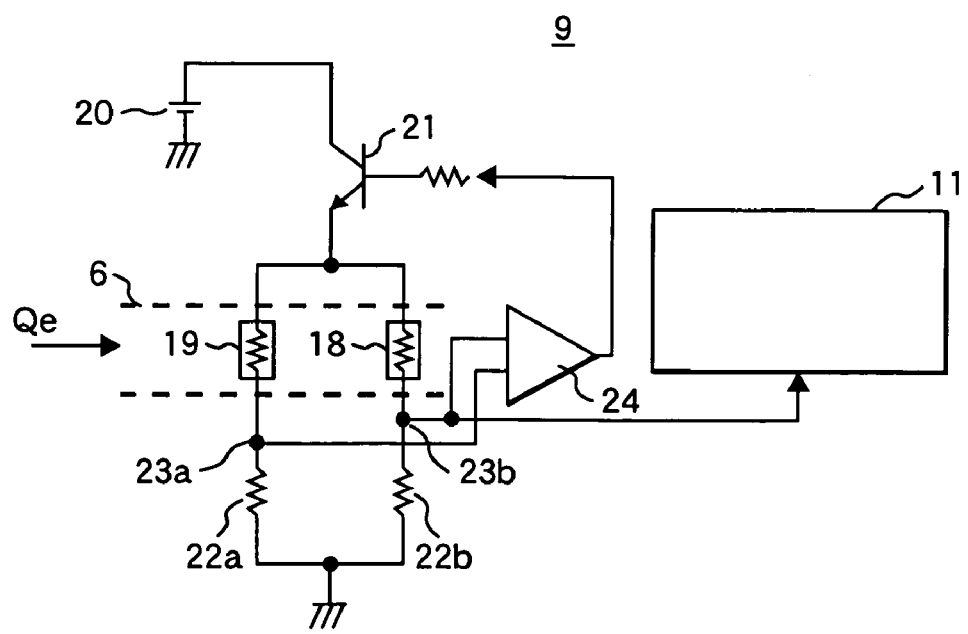
FIG. 4 is a configuration diagram of a recirculation exhaust gas mass flowmeter 9.

First, the operation principle of the recirculation exhaust gas mass flowmeter 9 will be described with reference to FIG. 4. 6 in FIG. 4 denotes the exhaust recirculation passage in which a heater 18 and an exhaust gas temperature sensor 19 are disposed. 20 denotes a power source, 21 denotes a transistor for passing heat current through the heater 18, 22a and 22b denote resistors, 24 indicates a differential amplifier, and 11 indicates the control unit.

A bridge circuit is comprised of the heater (heating resistor) 18, the exhaust gas temperature sensor 19, and the resistors 22a and 22b. Voltages of terminals 23a and 23b of the bridge are inputted to the differential amplifier 24. The differential amplifier 24 performs feedback control of setting the values of the resistors 22a and 22b so that temperature (Th) of the heater 18 becomes higher than the temperature (Te) of the exhaust gas temperature sensor 19 corresponding to the exhaust gas temperature by a predetermined temperature ($\Delta$Th=Th−Te).

For measurement of the recirculation exhaust gas mass flow quantity Qe, a terminal voltage across the resistor 22b corresponding to the heating current to be passed through the heater 18 is inputted to the control unit 11. Specifically, since the feedback control is performed so that when the mass flow quantity Qe increases, the heater 18 is cooled by the heat transfer effect of the exhaust gases and the heat of the heater 18 is increased to keep the predetermined temperature ($\Delta$Th=Th−Te). Accordingly, the heat current (corresponding to the terminal voltage of the resistor 22) increases and can be sensed as the mass flow quantity Qe.

The relation between discharged power Ph of the heater 18 and the recirculation exhaust gas mass flow quantity Qe is expressed by the following King's equation.

$$Ph = (a + b\sqrt{(Qe)})\Delta Th \quad (9)$$

The first term (a) of Equation (9) is a contributory amout of the thermal conduction effect, and the second term (b) is a contributory amount of the thermal transfer effect of the exhaust gases. When attention is paid particularly to the second term, Equation (9) becomes the following approximate expression.

$$Ph \approx \rho^{0.5} * \mu^{-0.13} * k^{0.63} * Cp^{0.37} * \sqrt{(Ue)} * \Delta Th \quad (10)$$

where $\rho$ denotes density of the exhaust gas, $\mu$ denotes viscosity coefficient, k denotes thermal conductivity, Cp denotes specific heat at constant pressure, and Ue indicates flow velocity.

From Equation (10), an output of the recirculation exhaust gas mass flowmeter 9 is a function of not only the heater temperature ATh but also physical property values ($\rho$, $\mu$, k, and Cp) of the exhaust gases. In the case where the intake air mass flowmeter 8 has the same configuration as the gas mass flowmeter 9, although the air which is a gas having a predetermined ratio of oxygen and nitrogen is ignorable, in the case of a recirculation exhaust gases, since the exhaust gas components largely change according to the operating conditions, the influence of the gas physical property values ($\rho$, $\mu$, k, and Cp) cannot be ignored. That is, it is understood that the output Qeo from the recirculation exhaust gas mass flowmeter 9 has to be corrected on the basis of concentrations of the exhaust gas components (gas physical property values ($\rho$, $\mu$, k, and Cp)).

Figure 5:
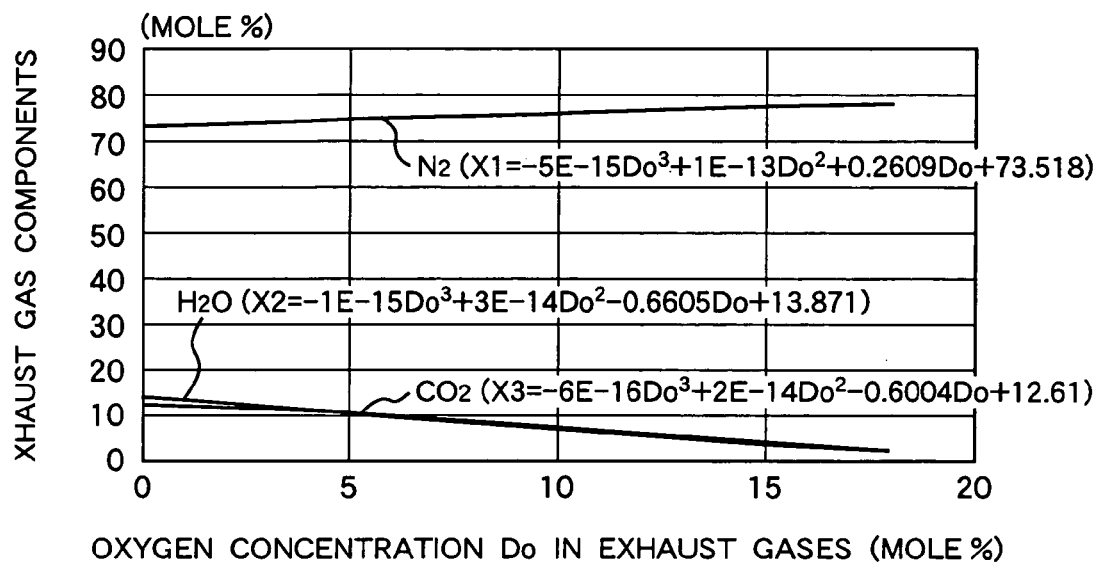
FIG. 5 shows results of calculation of an exhaust gas component.

When it is assumed that a diesel engine is used as the internal combustion engine, a general reaction in the case where the fuel is n-decane ($C_{10}H_{22}$) is as follows.

$$C_{10}H_{22+a}(15.5O_2+58.3N_2) \rightarrow 10CO_2 + 11H_2O + 15.5(a-1)O_2 + 58.3\,aN_2 \quad (11)$$

where "a" denotes an excess air ratio ($\geq 1$). When a=1 in Equation (11), complete combustion is performed, and the oxygen $O_2$ in the exhaust gas is zero. As "a" increases, the exhaust gas becomes leaner and the oxygen $O_2$ concentration increases. When the concentration (mole %) of oxygen $O_2$ in the exhaust gases is known from Equation (11), gas concentration (mole %) of carbon dioxide $CO_2$, nitrogen $N_2$, and moisture $H_2O$ as the other exhaust gas components are uniquely determined. FIG. 5 shows the result of calculation of Equation (11). In relation to the oxygen $O_2$ concentration Do (mole %) in the exhaust gases, the gas concentrations (mole %) of the carbon dioxide $CO_2$, nitrogen $N_2$, and moisture $H_2O$ as the other exhaust gas components are uniquely determined by the relational expression, and the concentration ratio of each of the exhaust gas components is computed.

After the concentration ratio of each of the exhaust gas components is determined, the gas physical property values ($\rho$, $\mu$, k, and Cp) of the total exhaust gas are obtained by the following equations. When the concentration ratio (mole %) of each of the exhaust gas components is set as Xi, the density $\rho$ of the total exhaust gases is expressed as follows.

$$\rho = \Sigma(\rho)i * Xi/100 \quad (12)$$

The specific heat Cp at constant pressure is expressed as follows.

$$Cp = \Sigma(Cp)i * Mi * Xi/M/100 \quad (13)$$

where Mi: molecular weight of each component
M: average molecular weight of total exhaust gases=$\Sigma Mi*Xi$.

The viscosity coefficient $\mu$ is expressed as follows.

$$\mu = \Sigma \mu i/(1+(1/Xi)*\Sigma(Xj\Phi ij))(i \neq j) \quad (14)$$

where $\Phi ij$ is expressed as follows.

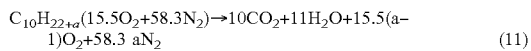

$$\Phi ij = (1+(\mu i/\mu j)^{1/2}(Mj/Mi)^{1/4})2/(4/\sqrt{2})/(1+Mi/Mj)^{1/2} \quad (15)$$

The thermal conductivity "k" is expressed as follows.

$$K = \Sigma ki/(1+(1.065/\eta i)\Sigma(Xj\Phi ij))(i \neq j) \quad (16)$$

Since the molecular weights Mi of the exhaust gas components (for example, the molecular weights Mi of oxygen, carbon dioxide, moisture, and nitrogen are 32, 44, 18, and 28, respectively) and the physical property values of the respective single gases of the exhaust gas components are known, when the concentration (mole %) Do of oxygen $O_2$ in the exhaust gases is known, the concentration ratio (mole %) Xi of each of the exhaust gas components is obtained from the relational expression shown in FIG. 5. Furthermore, when Equations (12) to (16) are used in addition, the density $\rho$ of the total exhaust gases, the specific heat Cp at constant pressure, viscosity coefficient $\mu$, and thermal conductivity k are obtained. Finally, the correction amount of the output Qeo from the recirculation exhaust gas mass flowmeter 9 can be calculated on the basis of the exhaust gas component concentrations (gas physical property values ($\rho$, $\mu$, k, Cp)) by the Equation (10).

Figure 6:
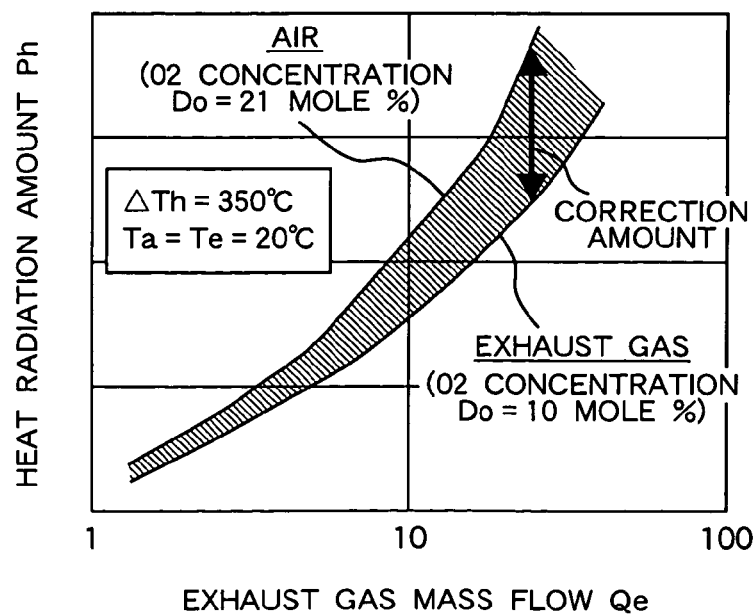
FIG. 6 shows results of calculation of an output of the flowmeter 9 in the case of a different exhaust gas component.

FIG. 6 shows a calculation result of the exhaust gas mass flow quantity Qe and the output (heat discharge amount Ph) of the recirculation exhaust gas mass flowmeter 9, in the case where air temperature Ta and exhaust gas temperature Te are 20° C. and the heater temperature $\Delta$Th=350° C., with respect to the air (oxygen concentration Do=21%) and the exhaust gas (oxygen concentration Do=10%). As shown in the diagram, a difference between the air (oxygen concentration Do=21%) and of the exhaust gas (oxygen concentration Do=10%) occurs in respective outputs (heat discharge amounts Ph).

Therefore, for example, in the case of adjusting the initial calibration of the recirculation exhaust gas mass flowmeter 9 with the air, when an output of the exhaust gases whose oxygen concentration Do is unknown is Qeo, the oxygen concentration (Do) of the recirculation exhaust gases is predicted by using Equation (8) using the Qeo value. Based on the predicted oxygen concentration (Do), the difference between the outputs (heat discharge amounts) shown in FIG. 6 is corrected to obtain a more-accurate recirculation exhaust gas mass flow Qe1 (=Oeo±correction amount (function of Do)).

A method which does not use the relational expression as described above can be also employed. In the storage of the control unit 11, the relation between the output V of the recirculation exhaust gas mass flowmeter 9 preliminarily subjected to the initial calibration with air and the mass flow quantity Qeo is stored as a map shown in FIG. 7. Further, as shown in FIG. 8, a corrected mass flow quantity Qij is similarly stored in the storage as a two-dimensional map of the output V of the recirculation exhaust gas mass flowmeter 9 and the oxygen concentration (Do) of the predicted recirculation exhaust gas.

When the output of the recirculation exhaust gas mass flowmeter 9 is V2, the recirculation exhaust gas mass flow quantity Qeo=Q2 before correction is obtained from the map of FIG. 7. Further, when the oxygen concentration predicted by using Qeo=Q2 becomes Do2, the correction amount Qij=Q22 is obtained from the output V2 and the mass flow quantity Q2 of the two-dimensional map of FIG. 8, and the corrected circulation exhaust gas mass flow quantity Qe1 can be calculated as follows.

$$Qe1 = Q2 + Q22 \quad (17)$$

By pre-storing the maps shown in FIGS. 7 and 8 in the storage in the control unit 11, the more-accurate recirculation exhaust gas mass flow quantity Qe1 can be obtained with calculation time smaller than that in the case of using the relational expressions.

In the embodiment of the invention, the recirculation exhaust gas mass flow signal Qeo is corrected on the basis of the predicted exhaust gas component concentration Do. The oxygen concentration Do in the total intake air containing the recirculation exhaust gases in the cylinder and the ratio between the oxygen quantity Qo in the total intake air and the fuel injection quantity Qr (oxygen quantity/fuel injection quantity ratio, Qo/Qr) are computed with high accuracy by using the corrected recirculation exhaust gas mass flow quantity Qe1. Therefore, the exhaust recirculation control system having high response and capable of performing high-accuracy EGR control reliably achieving both of a lower quantity of smoke and reduction in NOx can be realized.

Since the method of directly measuring the mass flow quantity by the intake air mass flowmeter 8 and the recirculation exhaust gas mass flowmeter 9 is employed, as compared with a conventional volume flow measuring method using a pressure sensor, the following advantages is effected. That is, higher-accuracy EGR control can be performed without being influenced by situations peculiar to apparatuses such that intake resistance increases due to clogging of an air cleaner or the like and an intake air quantity decreases.

In the foregoing embodiment, the output V of the recirculation exhaust gas mass flowmeter 9 preliminarily subjected to the initial calibration with air is used as the recirculation exhaust gas mass flow signal QeO. In the case of repeating computation synchronously with rotation of the cylinder of the internal combustion engine, re-calculation can be also performed by using the corrected recirculation exhaust gas mass flow Qe1 as the result of the immediately preceding calculation.

It is also possible to correct response delay time by using a transfer function model in order to correct physical time delay from the intake air mass flowmeter 8 and the recirculation exhaust gas mass flowmeter 9 into the cylinder.

Figure 9:
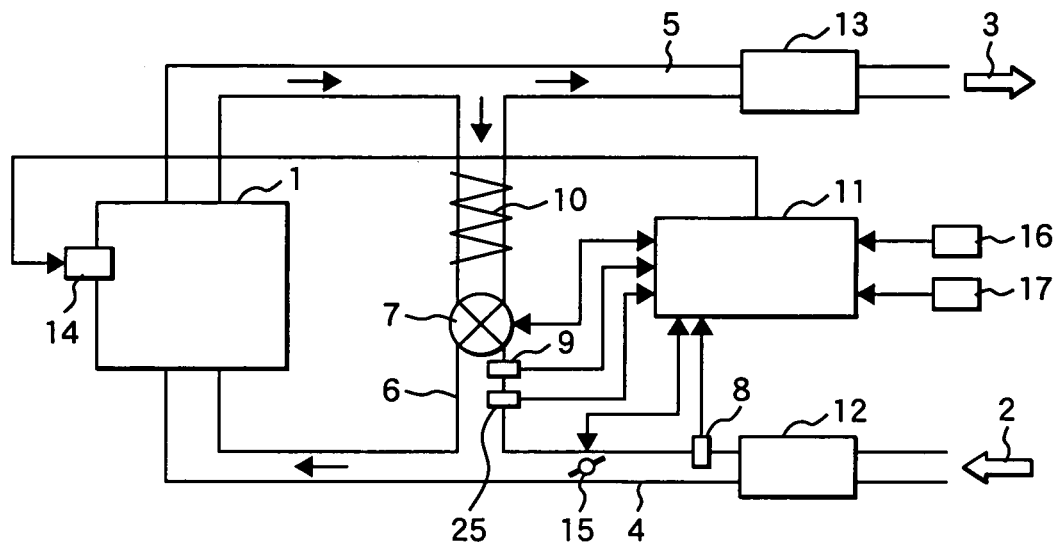
FIG. 9 is a block diagram of an exhaust recirculation control system as a second embodiment.

Next, an exhaust recirculation control system as a second embodiment of the present invention will now be described with reference to FIG. 9. In the diagram, the same reference numerals are given to components having the same configurations as those of the first embodiment of FIG. 1. The second embodiment is different from the first embodiment with respect to the following points: that is a configuration of the recirculation exhaust gas mass flowmeter 9 disposed in the exhaust recirculation gas passage 6; and an exhaust gas temperature sensor 25 is additionally disposed near the configuration of the recirculation exhaust gas mass flowmeter 9.

Figure 10:
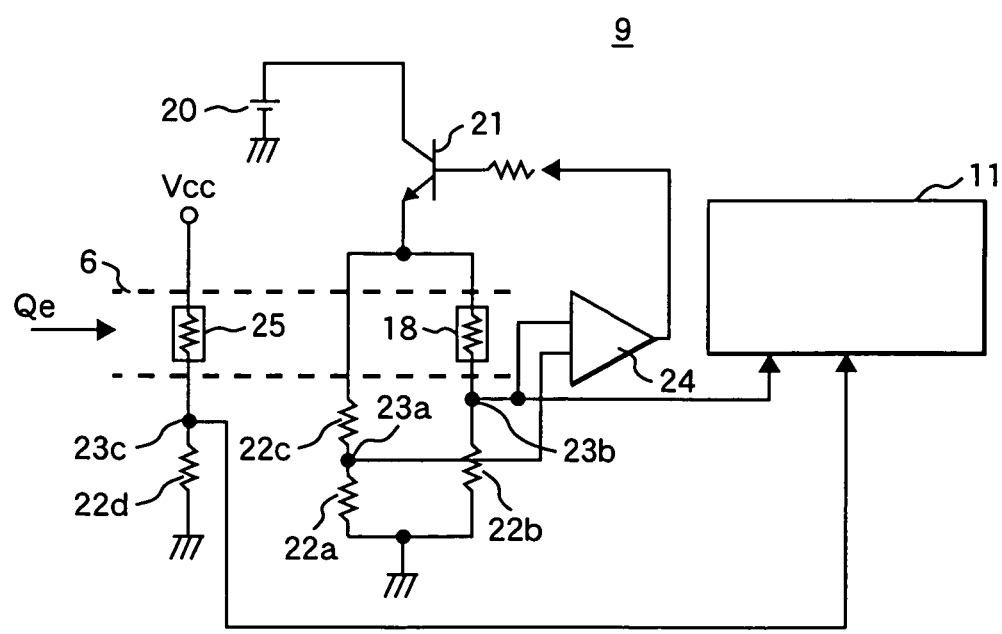
FIG. 10 is a configuration diagram of a recirculation exhaust gas mass flowmeter 9 as the second embodiment.

FIG. 10 shows a circuit configuration of the recirculation exhaust gas mass flowmeter 9 and the exhaust gas temperature sensor 25 of the second embodiment.

In the exhaust recirculation passage 6 in the diagram, the heater 18 and the exhaust gas temperature sensor 25 are disposed. The configuration in the exhaust recirculation passage 6 is the same as that of the first embodiment but the circuit configuration is different from that of the first embodiment. In the first embodiment of FIG. 4, the heater 18 and the exhaust gas temperature sensor 19 construct a bridge circuit. In the second embodiment, the exhaust gas temperature sensor 19 is replaced with a resistor 22c. Consequently, in the first embodiment, the feedback control is performed so that the temperature (Th) of the heater 18 becomes higher than the temperature (Te) of the exhaust gas temperature sensor 19 corresponding to the exhaust gas temperature by predetermined temperature ($\Delta$Th=Th-Te). In the second embodiment, the temperature is controlled to be a predetermined heater temperature (Th) irrespective of the exhaust gas temperature (Te).

By controlling the temperature to the predetermined heater temperature (Th), even in the case where the exhaust gas temperature (Te) largely changes, the heater temperature (Th) becomes constant. Consequently, the heater is not heated to an excessively high temperature, and occurrence of a trouble in the heater can be prevented. The exhaust gas also contains a large amount of suspended matters such as carbons. When the suspended matters such as carbon are adhered to the heater 18, the heat discharge effect (heat transmission) of the heater changes, and a sensing error occurs in the recirculation exhaust gas mass flowmeter. However, by controlling the heater temperature (Th) to a predetermined value of 400° C. or higher at which a baking effect is expected, adhesion of suspended matters such as carbon can be prevented, and a very reliable configuration can be realized.

On the other hand, when the control is performed to the predetermined heater temperature (Th), an output of the recirculation exhaust gas mass flowmeter 9 strongly depends on the exhaust gas temperature (Te) as shown in the Equations (9) and (10). Consequently, as shown in FIG. 10, the exhaust gas temperature sensor 25 is disposed in the exhaust recirculation passage 6, an output of the exhaust gas temperature (Te) is received from a terminal 23c to the control unit 11, and an output of the heat current flowing in the heater 18 (corresponding to the voltage at the end of the resistor 22b) is corrected.

Figure 11:
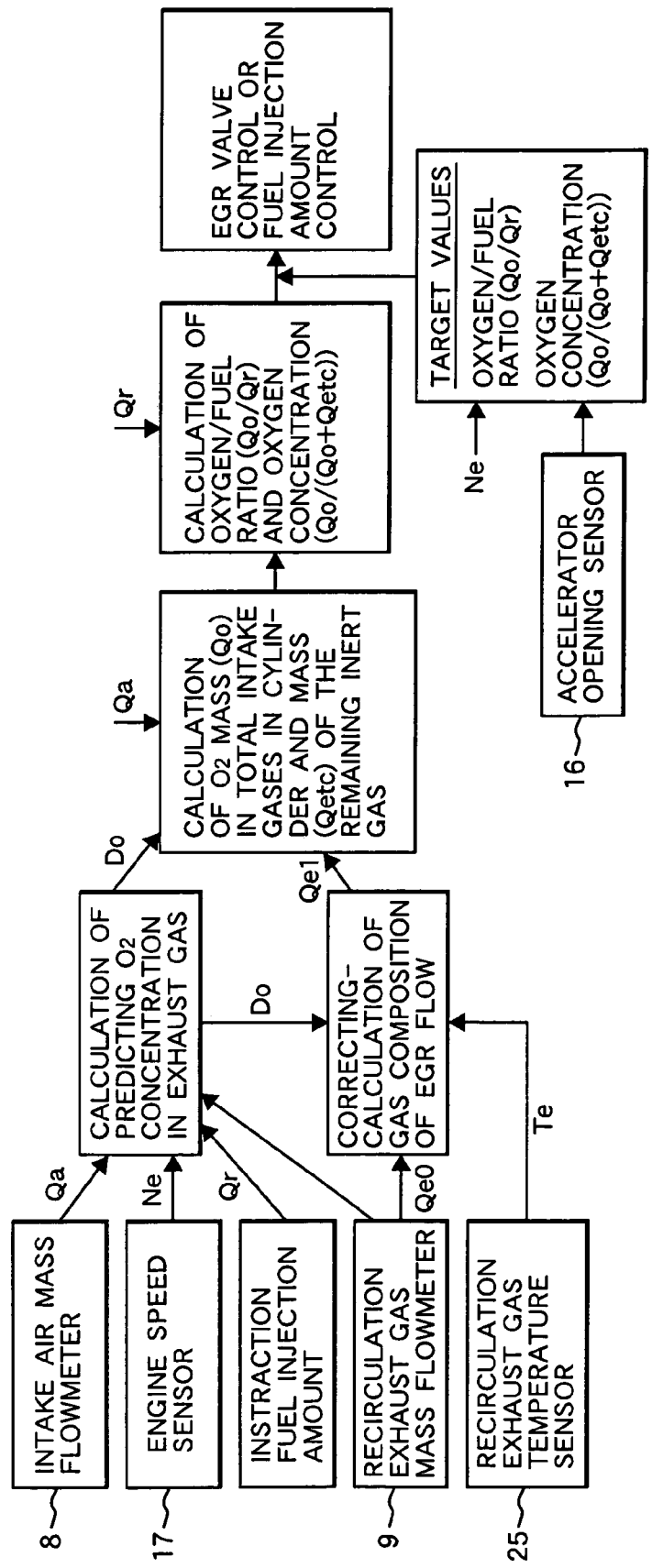
FIG. 11 is a diagram illustrating functions in an exhaust recirculation control method as the second embodiment.

FIG. 11 shows the exhaust recirculation control method executed by the control unit 11 of the embodiment. The point different from the first embodiment is that the exhaust gas temperature sensor 25 is added. Consequently, in the control unit 11, computation for predicting the exhaust gas component concentration (oxygen concentration Do) every combustion in the cylinder is performed. After that, based on the predicted exhaust gas component concentration (oxygen concentration Do) and the exhaust gas temperature (Te) of the exhaust gas temperature sensor 25, the recirculation exhaust gas mass flow quantity Qeo is corrected to obtain the corrected recirculation exhaust gas mass flow quantity Qe1.

Figure 12:
FIG. 12 is an output-oxygen concentration-exhaust gas temperature-mass flow correction three-dimensional map.
Figure 12:

In the first embodiment, as shown in FIG. 8, correction is made by using the two-dimensional map of the predicted exhaust gas component concentration (oxygen concentration Do) and the output (V) of the recirculation exhaust gas mass flowmeter 9. In the second embodiment, as shown in FIG. 12, correction is made by using a three-dimensional map of the predicted exhaust gas component concentration (oxygen concentration Do), the exhaust gas temperature (Te), and the output (V) of the recirculation exhaust gas mass flowmeter 9.

For example, when the output of the recirculation exhaust gas mass flowmeter 9 is Vi, the recirculation exhaust gas mass flow quantity QeO before correction is obtained as QeO=Qi from the map of FIG. 7. When the value of the predicted exhaust gas component concentration (oxygen concentration Do) is equal to Dok (Do=Dok), and the exhaust gas temperature (Te) is equal to Tej (Te=Tej), the correction amount is obtained as Qkji from the three-dimensional map of FIG. 12 on the basis of the output Vi, the oxygen concentration Dok, and the exhaust gas temperature Tej. And the corrected recirculation exhaust gas mass flow quantity Qe1 can be calculated as follows.

$$Qe1 = Qi + Qkji \quad (18)$$

From the recirculation exhaust gas mass flow quantity Qe1 corrected by the Equation (18), the predicted exhaust gas component concentration (oxygen concentration Do), and the intake air mass quantity Qa, the oxygen mass quantity Qo in the total intake air containing the recirculation exhaust gas in the cylinder and the other inert gas mass Qetc are computed. After that, the oxygen concentration (Qo/(Qo+Qetc)) in the total intake air containing the recirculation exhaust gas in the cylinder, and the ratio between the oxygen quantity in the total intake air and the fuel injection quantity (oxygen quantity/fuel injection quantity ratio) (Qo/Qr) are computed with high accuracy. The computed oxygen concentration (Qo/(Qo+Qetc)) in total intake air and quantity/fuel injection quantity ratio (Qo/Qr) are compared with a target oxygen concentration (Qo/(Qo+ Qetc)) in the total intake air and a target oxygen quantity/ fuel injection quantity ratio (Qo/Qr). The target oxygen concentration and the target oxygen quantity/fuel injection quantity ratio are pre-set according to engine operating conditions (engine speed Ne and the accelerator position) in the storing unit. Based on the result of such a comparison, the opening of the EGR valve 7, the throttle valve 15, or a fuel injection quantity Qr of the fuel injector 14 is controlled.

According to the embodiment, the reliability of the recirculation exhaust gas mass flowmeter 9 is improved, and the recirculation exhaust gas mass flow quantity Qe1 corrected with higher accuracy can be obtained.

Figure 13:
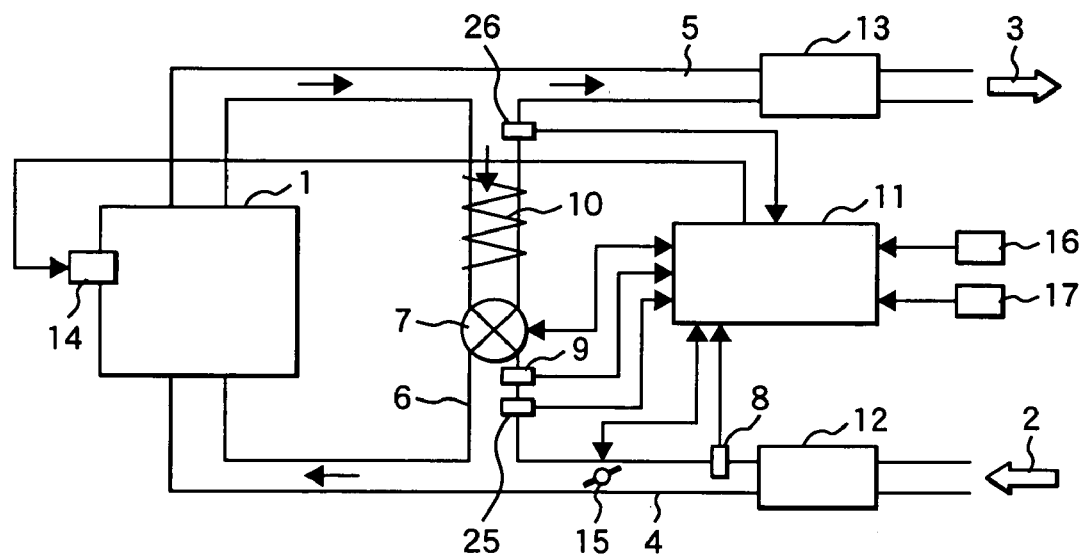
FIG. 13 is a block diagram of an exhaust recirculation control system as a third embodiment.
Figure 14:
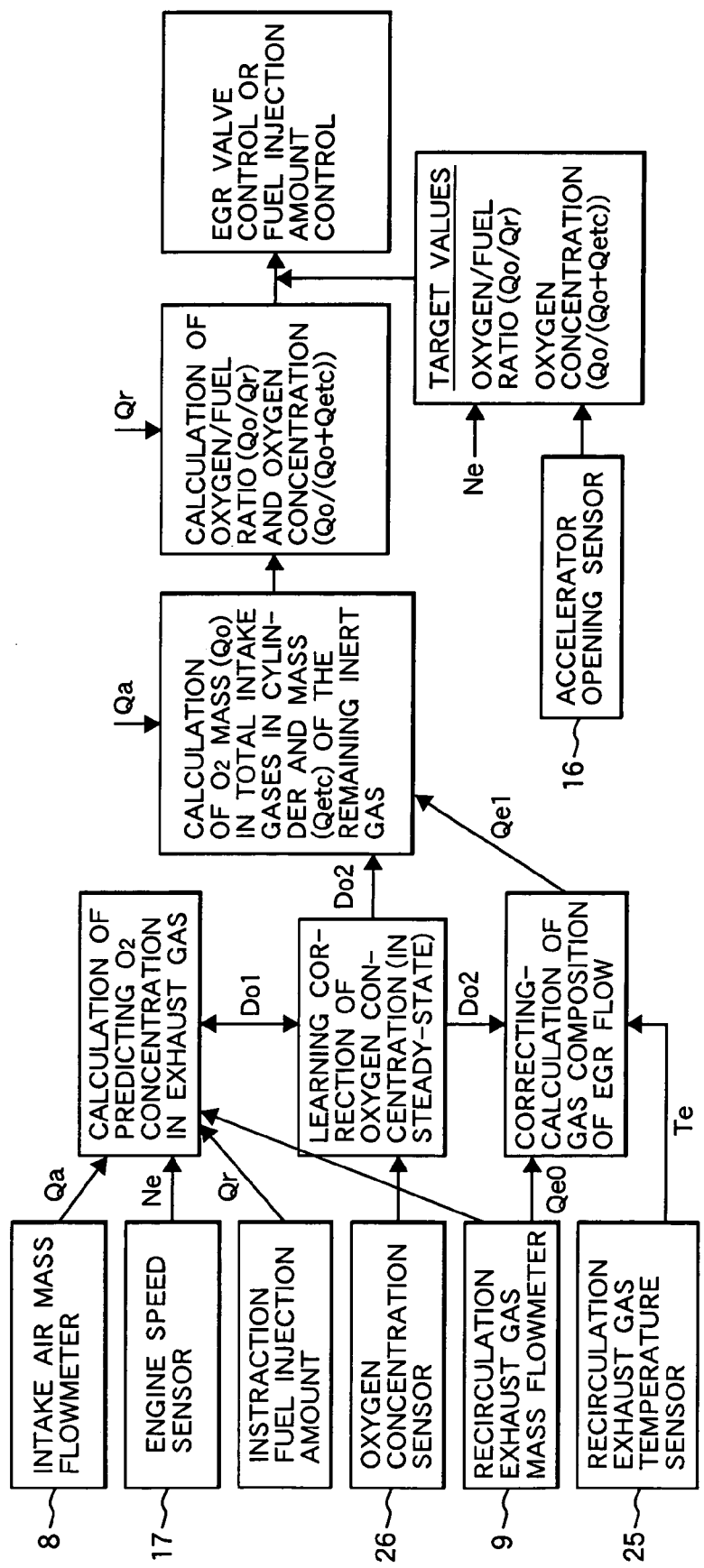
FIG. 14 is a diagram illustrating functions in an exhaust recirculation control method as the third embodiment.

Next, an exhaust recirculation control system as a third embodiment of the present invention will be described with reference to FIG. 13. In the diagram, the same reference numerals are given to components having the same configurations as those of the second embodiment of FIG. 9. The third embodiment is different from the second embodiment with respect to the point that an oxygen concentration sensor 26 is additionally disposed in the exhaust recirculation passage 6. FIG. 14 shows an exhaust recirculation controlling method executed by the control unit 11 as the third embodiment.

In the third embodiment, learning of an error in the predicted exhaust gas component concentration (oxygen concentration Do) is performed by using a sensing value of the oxygen concentration sensed by the oxygen concentration sensor 26, which is disposed in the exhaust circulation passage 6. By performing integral learning in a steady state, accuracy in the steady state improves. It is determined that the operating state of the internal combustion engine is the steady state by monitoring whether or not a change with time in the engine speed Ne, the accelerator position, or the fuel injection quantity Qr is a predetermined value within certain time.

In the control unit 11, a correction factor is stored as an error learn map every operating range determined by the engine speed Ne, the accelerator position, or the fuel injection quantity Qr. After error learning in the steady state, the correction factor is corrected and re-stored. After the error learning, the predicted exhaust gas component concentration (oxygen concentration Do2) is calculated every combustion in the cylinder.

According to the method, as compared with the case where the exhaust oxygen concentration is directly sensed by the oxygen concentration sensor attached to the exhaust passage 5 (the conventional technique using no prediction exhaust gas), there is no time delay which occurs during the period of time until the exhaust gases reach the oxygen concentration sensor, or there is no chemical reaction delay in the oxygen concentration sensor itself. Consequently, the exhaust oxygen concentration Do2 can be predicted with high accuracy. Therefore, by performing the EGR control or injection quantity control in accordance with the predicted exhaust oxygen concentration Do2, excellent response is obtained and control accuracy, particularly, control accuracy at the time of transition largely improves. Although the oxygen concentration sensor 26 is disposed in the exhaust recirculation passage 6 in the embodiment, similar effects of the invention can be produced even if such a disposition is adopted.

The recirculation exhaust gas mass flowmeter 9 as embodiments of the present invention, is adopted with a so-called direct heating type mass flowmeter in which the temperature of the heater 18 is heated so as to be higher than the exhaust gas temperature (Te) by predetermined temperature ($\Delta Th=Th-Te$) or so as to become predetermined heater temperature (Th). Obviously, similar effects of the invention can be produced also in the case of using a temperature difference type mass flowmeter, in which temperature sensors such as thermal sensitive resistors are respectively upstream and downstream of the heater and the mass flow is sensed from the difference of temperatures of the upstream and downstream temperature sensors.

With respect to the computation for predicting the exhaust gas component concentration of each combustion in the cylinder, the oxygen concentration in the exhaust gas is estimated in the embodiments. Furthermore, in place of the oxygen concentration as seen in Equation (11) and FIG. 5, it is possible to use information of the concentration of any of carbon dioxide, moisture, and nitrogen, because the concentration ratio of the oxygen, carbon dioxide, moisture, and nitrogen as the exhaust gas components can be known. Consequently, similar effects of the aforementioned embodiments can be also produced by using prediction value of the gas concentration or sensed value of gasflow sensor other than that of the oxygen concentration or the oxygen concentration sensor.

According to the embodiments, the high-accuracy EGR control which also deals with a rapid change in the operating conditions can be performed. And excellent effects such that the maximum reduction in NOx can be achieved while suppressing the smoke ejection quantity to be within the allowable range are obtained.

What is claimed is:

1. An exhaust gas recirculation control system of an internal combustion engine comprising:
   an EGR valve provided in an exhaust gas recirculation passage of the internal combustion engine;
   a gas mass flowmeter provided in the exhaust recirculation passage for measuring mass flow of recirculation exhaust gases flowing through the exhaust gas recirculation passage;
   an intake air mass flowmeter for measuring mass flow of intake air flowing through an intake passage of the internal combustion engine;
   a first computing means for computing an instruction quantity of fuel injection on the basis of operating conditions of the internal combustion engine;
   a predicting means for predicting the concentration of any component in the exhaust gases every combustion in each cylinder of the internal combustion engine, by using signals of the measured intake air mass flow and recirculation exhaust gas mass flow, and information of the computed instruction quantity of fuel injection;
   a second computing means for computing oxygen concentration in total intake air containing the recirculation exhaust gases in the cylinder, and computing the ratio between an oxygen quantity in the total intake air and a fuel injection quantity (hereinafter it's called as "oxygen quantity/fuel injection quantity ratio") on the basis of the intake air mass flow signal, the recirculation exhaust gas mass flow signal and the predicted concentration of any component in the exhaust gases, and
   a control means for controlling at least an opening of the EGR valve or the fuel injection quantity, by comparing said computed oxygen concentration in total intake air and oxygen quantity/fuel injection quantity ratio with target oxygen concentration in total intake air and a target oxygen quantity/fuel injection quantity ratio which are pre-set according to engine operating conditions, the system further comprises a correcting means for correcting the recirculation exhaust gas mass flow signal on the basis of the predicted concentration of any component in the exhaust gases, and the second computing means is constituted so as to compute the oxygen concentration in total intake air in the cylinder and the oxygen quantity/fuel injection quantity ratio, by using the corrected recirculation exhaust gas mass flow signal.

2. The exhaust gas recirculation control system according to claim 1, further comprising:

a temperature measurement element provided in the exhaust gas recirculation passage for measuring a recirculation exhaust gas temperature; and a correcting means for correcting the recirculation exhaust gas mass flow signal from the gas mass flowmeter on the basis of the predicted concentration of any component in the exhaust gases from the predicting means and the measured recirculation exhaust gas temperature signal from the temperature measurement element.

3. The exhaust gas recirculation control system according to claim 1, wherein the exhaust gas recirculation passage is provided with an $O_2$ sensor for sensing $O_2$ concentration of the exhaust gases and the predicting means is provided with a function of predicting an oxygen concentration in the exhaust gases and performing a learning correction so that the predicted oxygen concentration agrees with an output value of the $O_2$ sensor in a steady operating state.

4. The exhaust gas recirculation control system according to claim 1, wherein the exhaust gas recirculation passage is provided with an $CO_2$ sensor for sensing $CO_2$ concentration of the exhaust gases, and the predicting means is provided with a function of predicting $CO_2$ concentration in the exhaust gases and performing a learning correction so that the predicted $CO_2$ concentration agrees with an output value of the $CO_2$ sensor in a steady operating state.

5. The exhaust gas recirculation control system according to claim 1, wherein each of the intake air mass flowmeter and the gas mass flowmeter for the recirculation exhaust gases is comprised of a mass flowmeter having at least a heating resistor.

6. The exhaust gas recirculation control system according to claim 1, wherein the predicting means is capable of predicting each concentration of $N_2$, $O_2$, $CO_2$, and $H_2O$ of the exhaust gases.

7. The exhaust gas recirculation control system according to claim 1, wherein the predicting means is capable of predicting each concentration of $N_2$, $O_2$, $CO_2$, and $H_2O$ of the exhaust gases, the correcting means has a function of correcting the recirculation exhaust gas mass flow signal from the gas mass flowmeter by an amount of contributing to a thermal transfer effect, the contributing amount being obtained on the basis of concentration of each exhaust element of $N_2$, $O_2$, $CO_2$, and $H_2O$ predicted by the predicting means, and physical property values of density, coefficient of viscosity, thermal conductivity, and specific heat of each exhaust component of $N_2$, $O_2$, $CO_2$, and $H_2O$ predicted.

8. The exhaust gas recirculation control system according to claim 1, wherein the predicting means repeats computation a plurality of times until the predicted concentration of any component of the exhaust gases is converged to a predetermined value by using the recirculation exhaust gas mass flow corrected by the correcting means.

9. An exhaust gas flow measurement apparatus comprising:

a gas flowmeter for exhaust gases, which is provided in a passage for exhaust gas recirculation between an exhaust side and an intake side, and has a heating resistor controlled so as to have a predetermined temperature difference with respect to the temperature of the exhaust gases;

a means for predicting or sensing oxygen concentration of the exhaust gases; and a means for computing an flow quantity of the exhaust gases flowing through the passage on the basis of signals from the gas flowmeter and the means for predicting or sensing oxygen concentration.

10. The exhaust gas flow measurement apparatus according to claim 9, wherein the means for computing the flow quantity of the exhaust gases has the following functions: a function of computing an amount of heat discharged from the heating resistor to the exhaust gases on the basis of the signal from the gas flowmeter; a function of computing density, specific heat at constant pressure, coefficient of viscosity, and thermal conductivity of the exhaust gases on the basis of the oxygen concentration signal; and a function of computing the flow quantity of the exhaust gases on the basis of the density, the specific heat at constant pressure, the coefficient of viscosity, the thermal conductivity, and the heat discharge amount.

11. The exhaust gas flow measurement apparatus according to claim 9, wherein the oxygen concentration of the exhaust gases is predicted on the basis of an air flow quantity on the intake side of the internal combustion engine, a rotational speed of the internal combustion engine, and a quantity of fuel fed to the internal combustion engine.

12. The exhaust gas flow measurement apparatus according to claim 9, wherein the oxygen concentration of the exhaust gases is sensed by a sensor provided on the exhaust side of the internal combustion engine.

13. An internal combustion engine controlling apparatus comprising:

the exhaust gas flow measurement apparatus according to claim 9;

an air flowmeter provided on an intake side of the internal combustion engine for measure an air flow quantity on the intake side;

a fuel-feeding means for feeding a fuel to the internal combustion engine;

a control means for controlling the fuel-feeding means on the basis of the exhaust gas flow quantity and the oxygen concentration obtained by the exhaust gas flow measurement, and the air flow quantity on the intake side obtained by the air flowmeter.

14. A method for obtaining a flow quantity of exhaust gases flowing from an exhaust side to an intake side of an internal combustion engine through a passage for exhaust gas recirculation, by using a flowmeter provided in the passage, comprising the steps of:

predicting or sensing oxygen concentration of the exhaust gases; and obtaining the flow quantity of the exhaust gases flowing through the passage on the basis of a signal from the flowmeter and the oxygen concentration.

15. A method for obtaining a flow quantity of exhaust gases flowing from an exhaust side to an intake side of an internal combustion engine through a passage for exhaust gas recirculation, by using a flowmeter provided in the passage, wherein the flowmeter has a heating resistor controlled so as to have a predetermined temperature difference with respect to a temperature of the exhaust gases, and the method further comprising the steps of:

predicting or sensing oxygen concentration of the exhaust gases; and obtaining the flow quantity of the exhaust gases flowing through the passage on the basis of a signal from the flowmeter and the oxygen concentration.

16. The method according to claim 15, further comprising the steps of:

computing an amount of heat discharged from the heating resistor to the exhaust gases on the basis of a signal from the flowmeter;

computing density, specific heat at constant pressure, coefficient of viscosity, and thermal conductivity of the exhaust gases on the basis of the oxygen concentration; and obtaining the flow quantity of the exhaust gas flowing through the passage by computation on the basis of the density, the specific heat at constant pressure, the coefficient of viscosity, the thermal conductivity, and the heat discharge amount.

17. The method according to claim 15, wherein oxygen concentration of the exhaust gases is predicted on the basis of an air flow quantity on the intake side of the internal combustion engine, a rotational speed of the internal combustion engine, and the quantity of fuel fed to the internal combustion engine.

18. The method according to claim 15, wherein the oxygen concentration of the exhaust gases is sensed by a sensor provided on the exhaust side of the internal combustion engine.

19. An internal combustion engine controlling method comprising the steps of:

sensing a flow quantity of air flowing on an intake side of the internal combustion engine;

obtaining a flow quantity of exhaust gases flowing from an exhaust side to an intake side of the internal combustion engine through a passage for exhaust gas recirculation by using the method according to claim 15; and controlling a fuel fed to the internal combustion engine or the flow quantity of the exhaust gases flowing through the passage on the basis of the quantity of air flow on the intake side, the exhaust gas flow quantity, and oxygen concentration of the exhaust gases.

* * * * *